(12) United States Patent
Carney

(10) Patent No.: US 8,534,934 B1
(45) Date of Patent: Sep. 17, 2013

(54) CAMERA STABILIZATION DEVICE AND METHOD OF USE

(76) Inventor: Peter L. Carney, Salt Lake City, UT (US)

(*) Notice: Subject to any disclaimer, the term of this patent is extended or adjusted under 35 U.S.C. 154(b) by 0 days.

(21) Appl. No.: 13/517,846

(22) Filed: Jun. 14, 2012

(51) Int. Cl.
| G03B 17/48 | (2006.01) |
| H04N 5/225 | (2006.01) |
| F16M 11/02 | (2006.01) |
| F16M 11/04 | (2006.01) |

(52) U.S. Cl.
USPC .......... 396/428; 396/421; 352/197; 352/243; 348/373; 248/178.1; 248/187.1

(58) Field of Classification Search
USPC .......... 396/428, 419, 420, 421; 352/197, 352/243; 248/177.1, 178.1, 187.1; 348/373
See application file for complete search history.

(56) References Cited

U.S. PATENT DOCUMENTS 5,742,859 A * 4/1998 Acker ............................ 396/419
2011/0188847 A1* 8/2011 Mckay .......................... 396/421

* cited by examiner

*Primary Examiner* — Rochelle-Ann J Blackman
(74) *Attorney, Agent, or Firm* — J. Todd Rushton

(57) ABSTRACT

The present invention is a dynamically balanced, lightweight multifunctional, camera stabilization device that allows a film or digital video camera to be flown out of arms reach of the operator and maintain orientation toward the subject matter, while allowing the operator smooth control of rotation or pan of the camera.

20 Claims, 12 Drawing Sheets

CAMERA STABILIZATION DEVICE AND METHOD OF USE

BACKGROUND OF THE INVENTION

A number of devices have been introduced to help film makers produce clear, stabile motion picture, home movies and video images, including, tripods, monopods, clamps, booms, etc. These devices work well when the camera is in a relatively fixed position and the subjects are in motion. However, these types of devices do not work well when it is necessary to have the camera in motion along with the subject and, this is especially true, when the camera is hand held or supported by a user.

There are some devices designed to stabilize a camera when it is hand held or supported by the user that are based on the principle of lowering the center of gravity of the assembly below a three-axis pivot point where the user's handle is attached, and by weighting the assembly to create a high moment of inertia. In this arrangement, the camera is allowed to pivot freely about the center of inertia of the whole filming apparatus, similar to the basic device shown in U.S. Pat. No. 2,007,215 to Remey, for a STABILIZED VIBRATION ABSORBING MOUNTING, filed Nov. 12, 1931. This type of camera stabilizer works on the principles of momentum, where the momentum of the camera and camera mounting above the three-axis pivot point is equal to the momentum of the counter-balance arms extending below the three-axis pivot point. This equally balanced, freely pivoting support, allows for, a clear and stabile image even when the user's hand is shaking or oscillating, side to side, front to back or is canted. In most circumstances, even when the user's hand, holding the apparatus, moves off the center of the field of the view, the camera lens will continue to aim down the original line of focus.

Due to the requirement of high moment of inertia, most camera stabilization devices are heavy and can be unwieldy. In order to accommodate the weight and size of the device, many of the stabilizers are attached to belts, harnesses or chest packs, such as the devices described in U.S. Pat. No. 4,017,168 to Brown, for EQUIPMENT FOR USE WITH HAND HELD MOTION PICTURE CAMERAS, filed Sep. 16, 1974 and U.S. Pat. No. 4,158,488 to Gottschalk, for BODY MOUNTED SUPPORT DEVICE FOR MOTION PICTURE CAMERA, filed Jul. 19, 1976. The stabilization feature and the camera are supported by an arm that is attached to the support harness and extends away from the user's body. In order to maintain orientation of the camera, the user is required to control the camera with at least one hand at all times. Some newer camera stabilization devices are designed to work with lighter weight cameras, such as, U.S. Pat. No. 4,946,272 to Brown, for STABILIZED EQUIPMENT SUPPORT, PRIMARILY FOR USE WITH LIGHT-WEIGHT CAMERAS, filed Sep. 22, 1988. However, these devices are inherently unstable and require the operator to employ both hands to control field of view and stability.

A limitation for each of these devices is that they cannot be extended away for the user or operator. In some situations it is necessary to extend the stabilized camera away from the user to avoid obstructions between camera and the subject being filmed or the user may simply desire to change the artistic perspective. There are options to extend the camera away from the user on a jib pole such as the device shown in U.S. Pat. No. 5,065,249 to Horn, for a PORTABLE VIDEO CAMERA/MONITOR SUPPORT, filed Sep. 26, 1988. However, this device does not include any form of stabilization and if combined with any of the other aforementioned devices, the user would not be able to reach up and control at least one axis of the camera in order to direct the shot or completely stabilize the image.

What is needed is a camera stabilization device that can be jib or pole mounted allowing a camera to be "flown" out of arms reach of the user while still allowing the user to direct the field of view without directly manipulating the camera.

SUMMARY OF THE INVENTION

The present invention is a dynamically balanced, light weight multifunctional, camera stabilization device that allows a film or digital video camera to be flown out of arms reach of the operator and still maintain orientation toward the subject matter.

One embodiment of the present invention or camera stabilization device is a camera stabilizer apparatus consisting of an adjustable camera mounting frame having plurality of at least three weighted counter-balance legs attached. A three-axis rotatable bearing adjustably attached to the camera mounting frame, at the center of inertia of the camera mounting frame and counterweight assembly. A handle attached to the three-axis bearing opposite the camera mounting frame, the handle having an adjustable friction device; allowing the user to pan the camera by rotationally manipulating the handle. A receptacle or socket formed in the end of the handle allowing attachment of the complete apparatus to a jib pole or rod.

In one embodiment of the present invention or camera stabilization device, the camera mounting frame is a typical two rail system where the camera mounting platform can be adjusted forward or back and side to side, allowing the user to adjust the camera position for both ergonomics during use, and to use the camera mass to influence the orientation of the camera while the filming. The camera position can be adjusted to move the center of gravity of the entire mounting system into a position directly in line with the three-axis bearing where, when the camera is flown, the camera will maintain a substantially level orientation. The user may move the center of gravity slightly forward of the three-axis bearing, changing the camera line sight or orientation to point downward. If the center of gravity is moved aft of the three-axis bearing the camera will point upward. The camera mounting frame may also accommodate a plurality of accessories such as handles, grips, chest mount, or a shoulder stabilization support.

One embodiment of the present invention or camera stabilization device the counter-balance legs having a plurality removably attached weights. In one embodiment, the removable weights are the same mass in another embodiment the removable weights a different mass or the mass of each weight is determined in a graduated series. Each of the plurality of support legs configured to receive a plurality of the weights. The user may choose to install a consistent number of weights on each of the plurality of support legs, however, if the configuration of the camera and camera mounting platform dictate, the user may increase the number of weights on one or more of the plurality of support legs. For example, where a large telescopic lens is installed on the camera, it may be necessary to both, adjust the camera mounting platform, and increase the number of weights on the rear support leg or legs. In one embodiment, the bottom portion of the support legs has a screw thread allowing each individual weight to be threaded or spun unto the support leg. In another embodiment, the support legs having a receiving rod or smooth portion where the individual weights, having a reciprocal hole drilled in the center, can be slid onto the receiving rod and the plurality of weights being securely fastened with a threaded or locking cap which, attaches to the base of the support leg. In yet another embodiment, the plurality of weights friction or interference fit onto the base of the support leg. In yet another embodiment, the counter-balance legs may be extensible in length with a given number of weights to effect a change in balance and/or the location of the moment of inertia. The total number of weights, the length of the counter-balance legs, or the total mass of the weights, added to the camera stabilizer system is dependent upon the mass of the camera mounted onto the system; if a camera is larger, having a substantial mass, additional mass and/or additional length of the legs must be added to allow the moment of inertia of the counter-balance stabilizer to substantially equal the moment of inertia of the camera. If a smaller camera is used, the total mass, the length of the counter-balance legs and/or the total number counter-balance weights can be reduced. In one embodiment of the present invention the density of the counter-balance weights can be modified to allow differential weighting of the support legs without modifying the overall length of the support leg. In yet another embodiment, the support legs have a length adjustment independent of the counter-balance weights.

In one embodiment of the present invention or camera stabilization device, the stabilizer includes three counter-balance support legs, where two support legs configured as a pair extending from a bracket configured to attach to the front portion of the camera mounting frame and the third support leg is centered on a bracket configured to attached to the rear portion of the camera mounting frame. The counter-balance support legs angled outward to increase the moment of inertia and to create a support base out of the camera stabilizer device. One embodiment the stabilizer includes four counter-balance support legs, two support legs on a bracket positioned proximate the front portion of the camera mounting frame and two legs on a bracket positioned on each side, proximate the rear portion of the camera mounting frame. In another embodiment the stabilizer includes more than four counter-balance support legs, each of the legs spaced approximately equal around the perimeter of the camera mounting frame.

In one embodiment of the present invention or camera stabilization device, the counter-balance support legs having an equal length, allowing the user to place the assembled device onto a flat surface, such as a table, and the camera maintaining a substantially level orientation. The user may use the device as a tripod or stationary support during filming or may place the device on a flat surface to allow the use of both hands while making adjustments to the device or to the camera. The user may also use the support legs as handles during filming. The assembled camera stabilization device can be stored while securely resting on the counter-balance legs.

One embodiment of the present invention or camera stabilization device, the handle movably attached to the camera mounting base. In another embodiment of the present invention, the handle is movably attached to the camera mounting base and includes an adjustable friction device which allows the user to pan the camera by rotating handle. The adjustable friction device determines the amount of rotation of the handle that is translated through the three-axis bearing and into the camera support frame, panning or changing the orientation of the camera laterally. The adjustable friction device may be a flat washer made of a material such as stainless steel, brass, bronze, plastic or nylon. In another embodiment, the adjustable friction device may be a curved spring steel washer, where friction is increased by compressing the washer. Compression may be achieved by tightening a top compression nut or a pressure plate assembly.

In one embodiment of the present invention or camera stabilization device, the jib pole or rod is a fixed length. In another embodiment the jib pole or rod is adjustable.

In one embodiment of the present invention or camera stabilization device includes a progressive three-axis bearing lock-out mechanism, allowing a user to adjust the amount of influence between the handle or, the handle with the connected jib pole, and the camera mounting apparatus. In one embodiment, the progressive lock-out mechanism is a brush or flexible cup that overlaps the three-axis bearing assembly and can be actuated to engage a friction cone having a knurled or fluted top attached to the bottom surface of the camera mount platform. When the progressive lock-out mechanism is in an open position, the camera stabilization assembly is allowed to oscillate freely in relationship to the handle and the three-axis bearing. However, as the mechanism is partially engaged, the brush bristles or thin upper edge of the cup will create friction with the cone assembly, allowing the user to pan or tilt the camera more readily. When the progressive lock-out assembly is fully engaged, the camera stabilization function of the device eliminated, allowing the user to induce pan or tilt to the camera assembly without the automatic correction of the stabilizer, similar to using a fixed pole device. In one embodiment the bristles of the brush assembly is made of material such as plastic, nylon, silicon or other synthetic material. In another embodiment the brush assembly bristles are a natural material. In another embodiment of the present invention, the cup could be a type of flexible elastomeric material or rubber having an upper edge which is supple and flexible and progressively stiffer toward the bottom. It is recognized by adjusting the stiffness or resiliency of the brush assembly bristles or cup material, the nature of the engagement between the brush/cup assembly and the friction cone can be varied or changed.

In another embodiment of the present invention or camera stabilization device, the progressive lock-out assembly includes a top brush assembly fixedly attached to the camera mounting platform and second brush assembly that can be progressive engaged, bristle to bristle, with the top brush assembly.

In one embodiment of the present invention or camera stabilization device, the progressive lock-out assembly is engaged from the base of the jib pole by an actuation lever that is compressed or squeezed by the user. A connecting rod is attached at a first end to the base of the brush assembly and the second end attached to a linkage associated with the actuation lever. When the actuation lever is compressed, the linkage and connecting rod translates the lever compression into vertical movement which engages the brush/cup assembly. In another embodiment of the present invention it is contemplated that the progressive lock-out mechanism includes a brush/cup mechanism that is actuated by twisting a sleeve surrounding the jib pole, the sleeve and brush/cup assembly attached to a fixed threaded jack assembly, which when twisted, progressively engages or disengages the brush/cup.

These and other features and advantages of the disclosure will be set forth and will become more fully apparent in the detailed description that follows and in the appended claims. The features and advantages may be realized and obtained by the instruments and combinations particularly pointed out in the appended claims. Furthermore, the features and advantages of the disclosure may be learned by the practice of the methods or will be obvious from the description, as set forth hereinafter.

BRIEF DESCRIPTION OF DRAWINGS

The following description of the embodiments can be understood in light of the Figures, which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals in different drawings represent the same element, and thus their descriptions may be omitted.

DETAILED DESCRIPTION OF THE INVENTION

Figure 1:
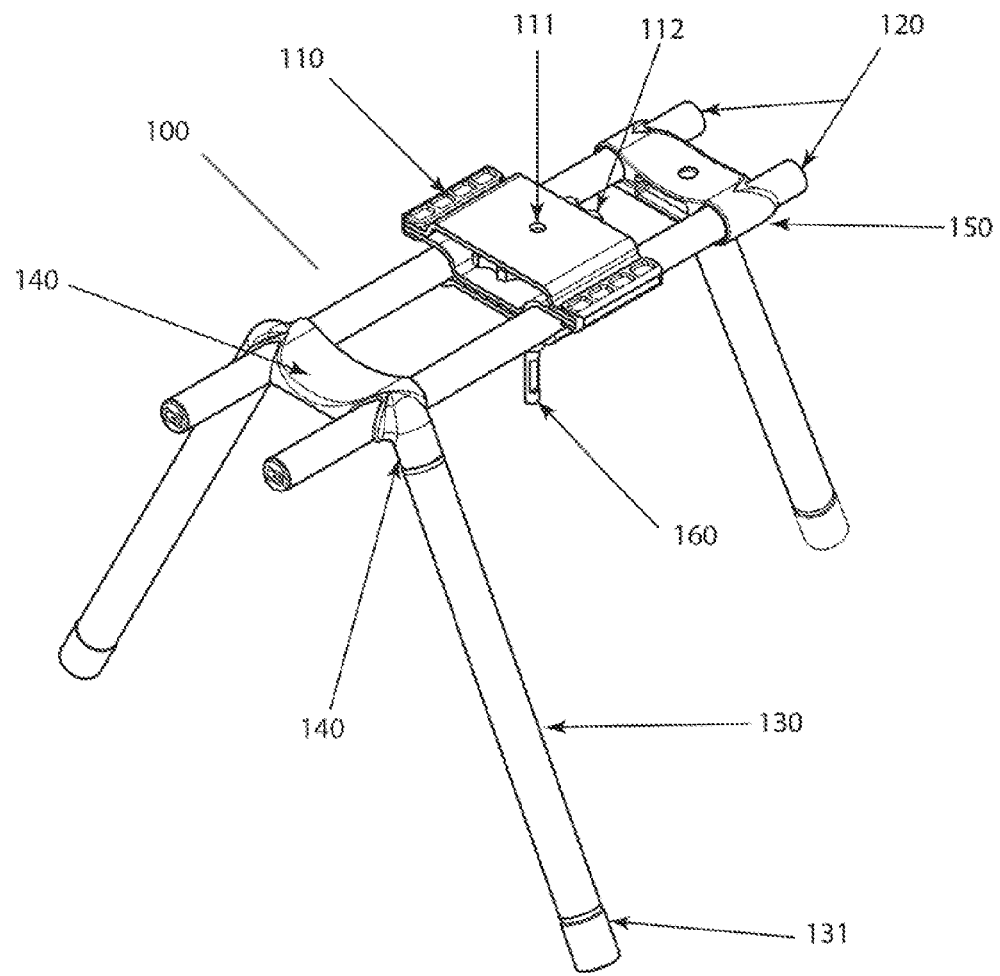
FIG. 1 illustrates a detailed perspective view of the present invention or camera stabilization device.
Figure 2:
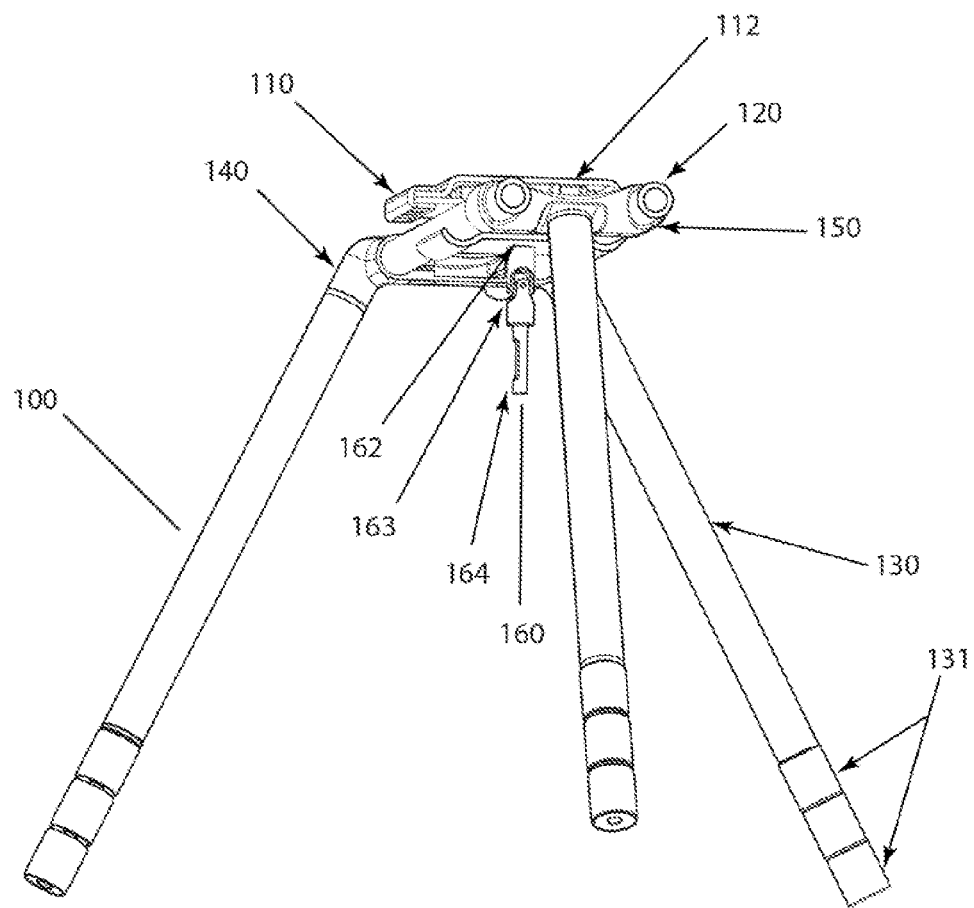
FIG. 2 illustrates a detailed perspective view of the present invention or camera stabilization device.
Figure 3:
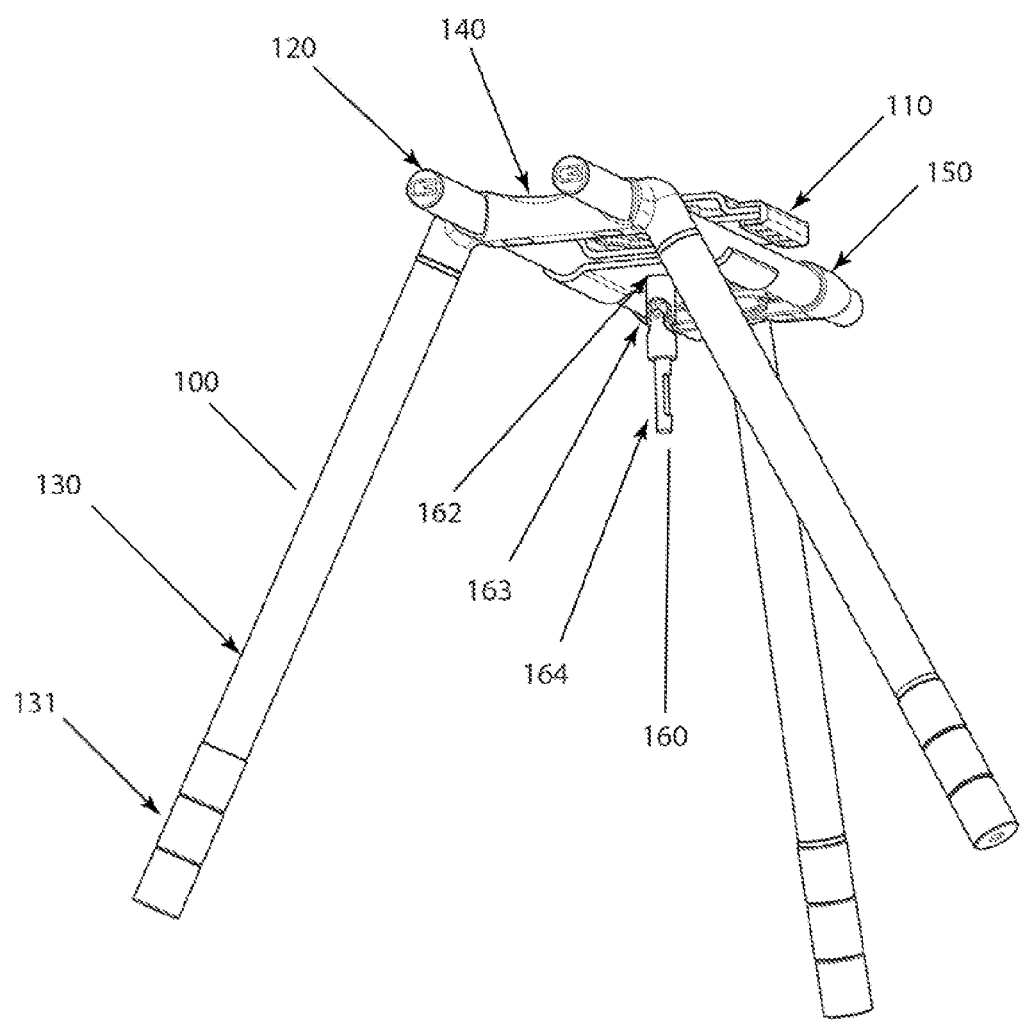
FIG. 3 illustrates a detailed perspective view of the present invention or camera stabilization device.
Figure 4:
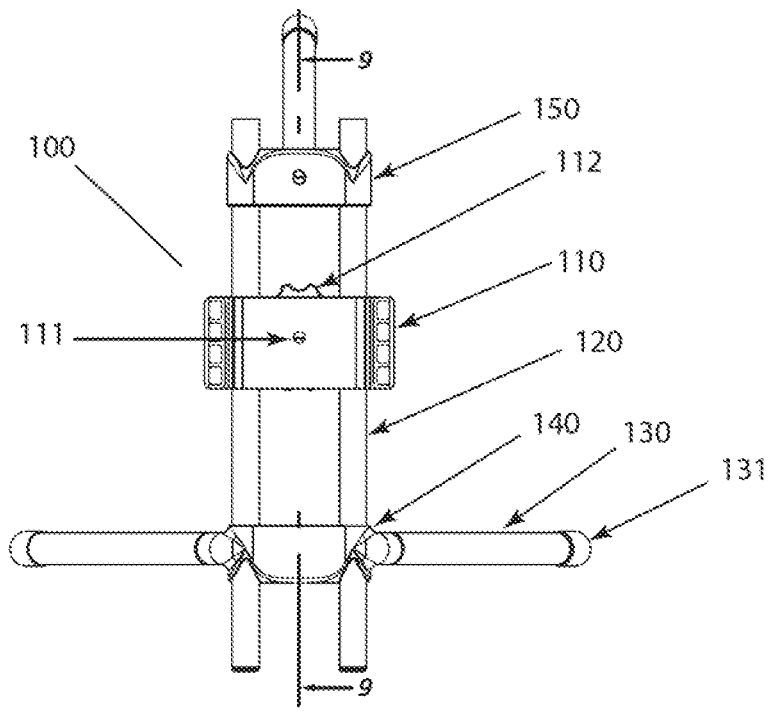
FIG. 4 illustrates a top view of the present invention or camera stabilization device.
Figure 5:
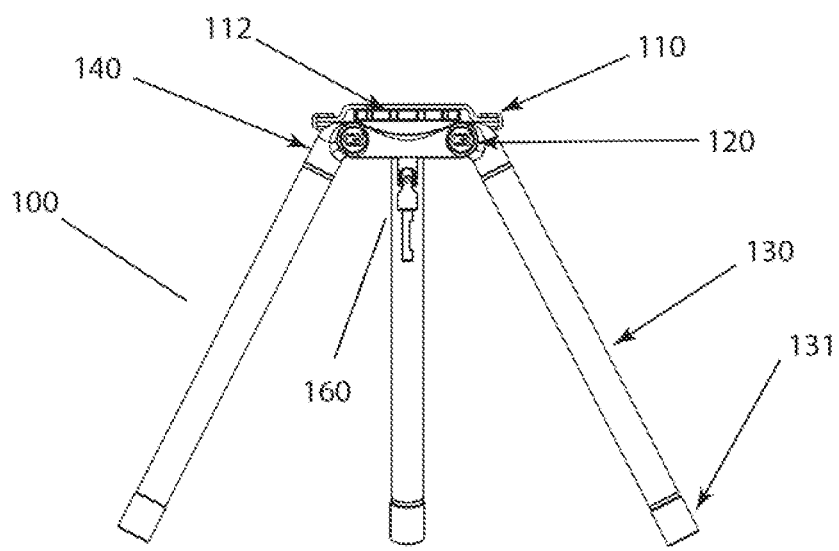
FIG. 5 illustrates a front view of the present invention or camera stabilization device.
Figure 6:
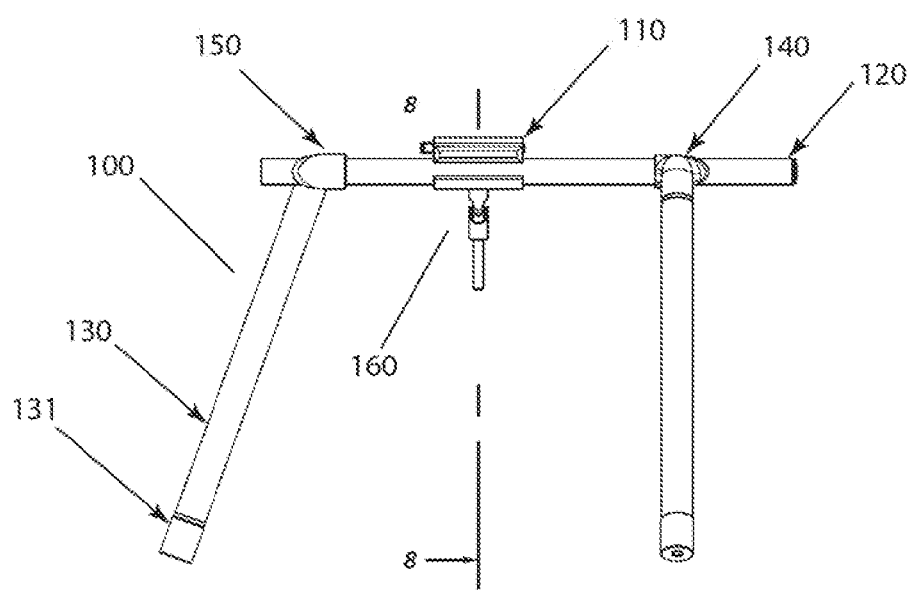
FIG. 6 illustrates a right side view of the present invention or camera stabilization device.
Figure 7:
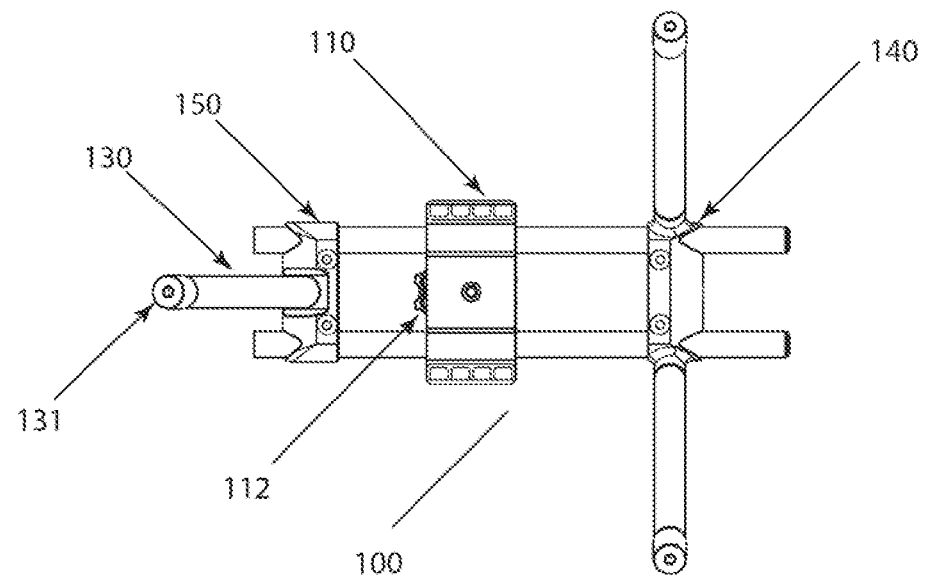
FIG. 7 illustrates a bottom view of the present invention or camera stabilization device.
Figure 8:
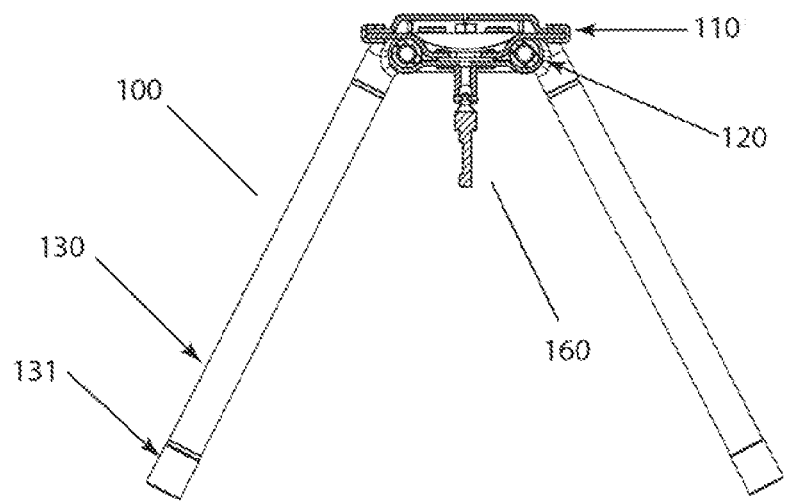
FIG. 8 illustrates a section view of the present invention or camera stabilization device.
Figure 9:
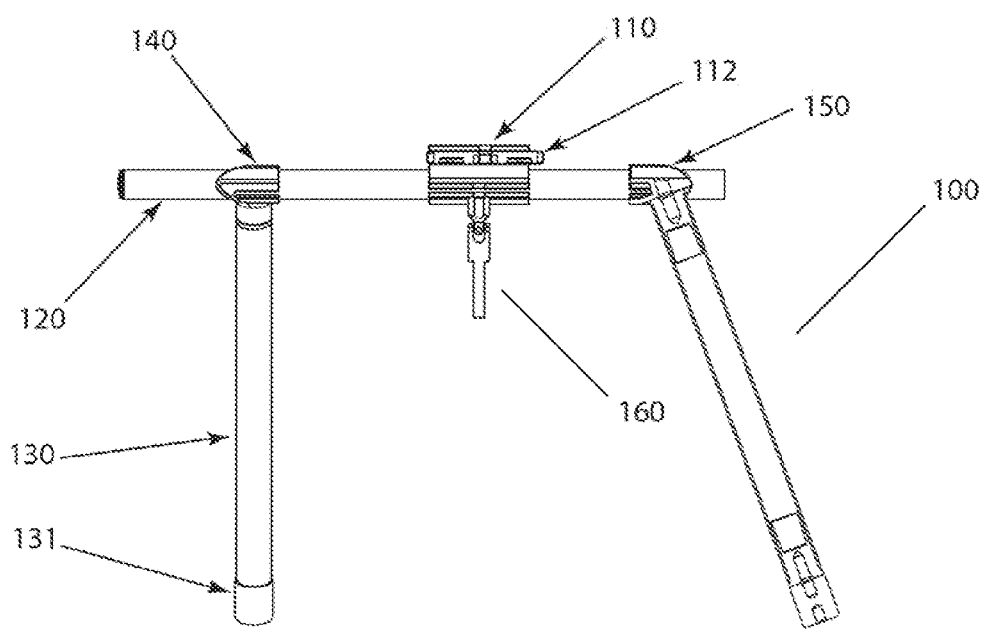
FIG. 9 illustrates a section view of the present invention or camera stabilization device.

For the purposes of promoting an understanding of the principles in accordance with the disclosure, reference will be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

As used in this specification and the appended claims, the singular forms "a," "an," and "the" include plural referents unless the context clearly dictates otherwise. In describing and claiming the present disclosure, the following terminology will be used in accordance with definitions set out below. The term camera mounting frame refers to a traditional two rail stabilizer frame capable of accommodating a camera mounting platform, three or more counter-balance support legs and a plurality of accessories. The camera mounting platform is defined as a movable bracket designed to fixedly attach the camera to the frame; the mounting may be accomplished using a thumb-screw threaded into the base of the camera, or it may be accomplished using a quick release mechanism as commonly known in the art. The camera mounting platform allows the camera position to be adjusted both longitudinally and laterally. The counter-balance support legs are a plurality of extended rods, used for distribution of weight, to increase the moment of inertia, used to support the assembly on a flat surface and may be used as handles during filming. A handle as commonly known in at the art, wherein the user may grasp and support the camera stabilization device. Moment of inertia, as commonly known in the art, including the resistance of an object to movement about a point. Center of gravity as commonly known in the art. Three-axis bearing meaning a bearing capable of isolating each of roll, pitch and yaw, the bearing may be a u-joint, gimbal, or ball joint. The terms free-floating and multi-axis bearing may be used as a replacement for three-axis bearing. As used herein, the terms "comprising," "including," "containing," "characterized by," and the grammatical equivalents thereof are inclusive or open-ended terms that do not exclude additional, unrecited elements or method processes.

Illustrated in FIGS. 1 through 9, is one embodiment of the present invention or camera stabilization device 100. The camera stabilization device 100 includes a traditional two rail mounting frame 120 where camera mounting platform 110 and counter-balance support legs 130 are attached.

The camera mounting platform 110 includes a camera attachment point 111, the attachment point 111 may be a screw thread or may be a quick release mechanism used to securely attach a camera to the mounting platform 110. Mounting platform 110 can be adjusted longitudinally by releasing screw clamp knob 112.

A front clamp 140 is configured to accept two counter-balance support legs 130, front clamp 140 includes a relieved portion 141 allowing the camera stabilizer device 100 to accommodate most cameras having a telephoto lens. A rear clamp 150 is configured to receive one support leg 130. In another embodiment of the present invention, it is contemplated that camera stabilizer device 100 may incorporate four support legs 130 or in yet another embodiment it is contemplated that more than four counter-balance support legs 130 are arranged evenly around the perimeter of the camera support frame 120.

Support legs 130 are angled outward or splayed from the support frame 120 and are an equal length, this arrangement creates a stable platform that can be rested on a flat surface and used as a fixed placement camera tripod or the camera stabilization device 100 can be stored resting on the support legs 130.

Each of the support legs 130 is configured to receive at least one or more counter-balance weights 131. The counter-balance weights 131 may be screwed onto a threaded rod section at the base of the support legs 130. In another embodiment the counter-weights 131 have a threaded screw section and a thread hole on the opposite side, the support leg 130 having a reciprocal threaded hole allowing attachment of a first counter-balance weight 131 to the base of the support leg 130 and second counter-balance weight 131 to be threaded into the hole of the first counter-balance weight 131. It is contemplated that counter-balance weights 131 may be attached to the support legs using a friction fit or may be attached using a keyed quick connect method as commonly known in the art.

A three-axis bearing assembly 160 is attached to the underside of camera mounting platform 110. The bearing assembly 160 includes a rotating mounting point 162, a u-joint section 163 and handle spline 164. The handle spline 164 allows for secure attachment of a handle.

Figure 10:
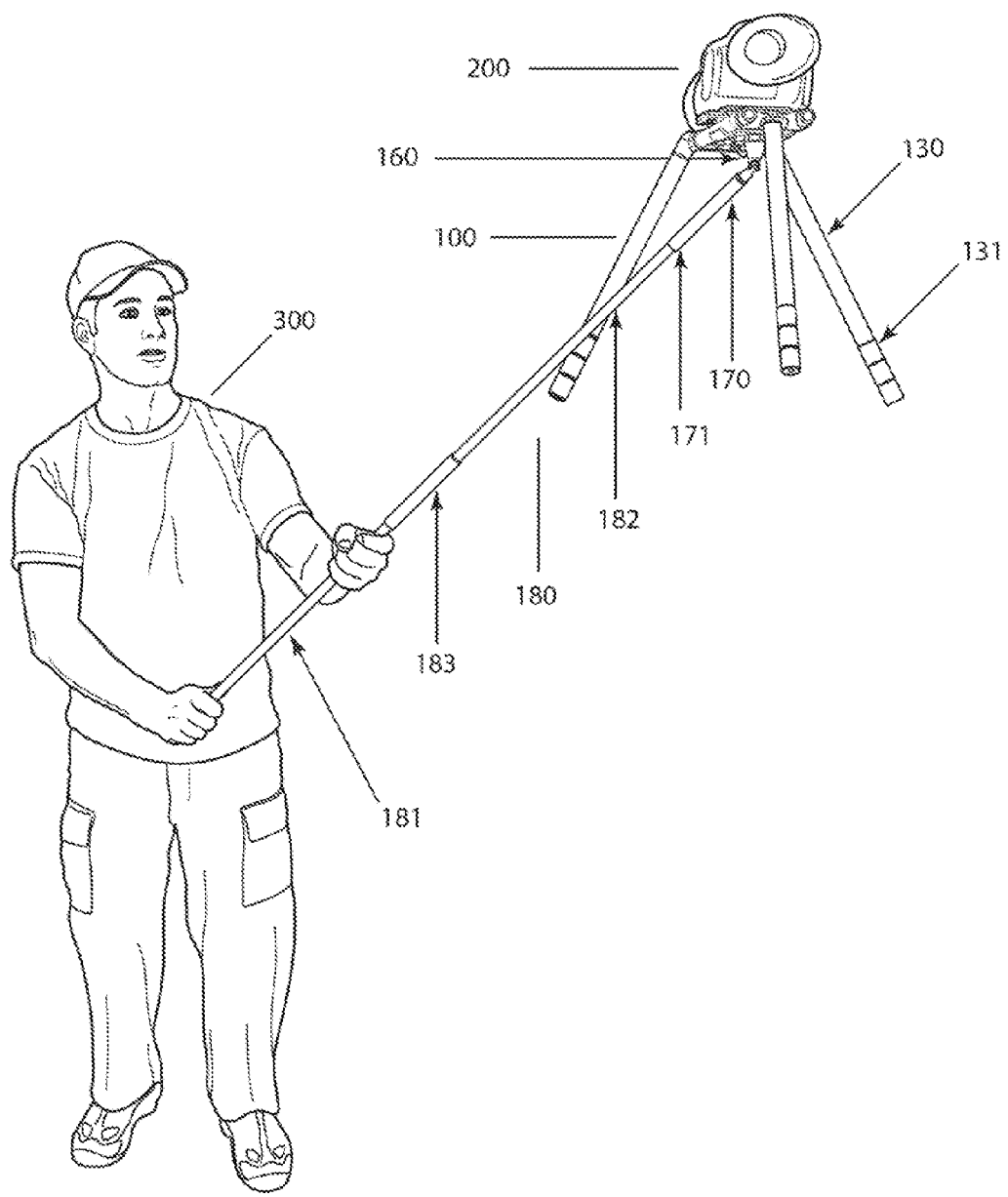
FIG. 10 illustrates the present invention or camera stabilization device as deployed by a user.
Figure 11:
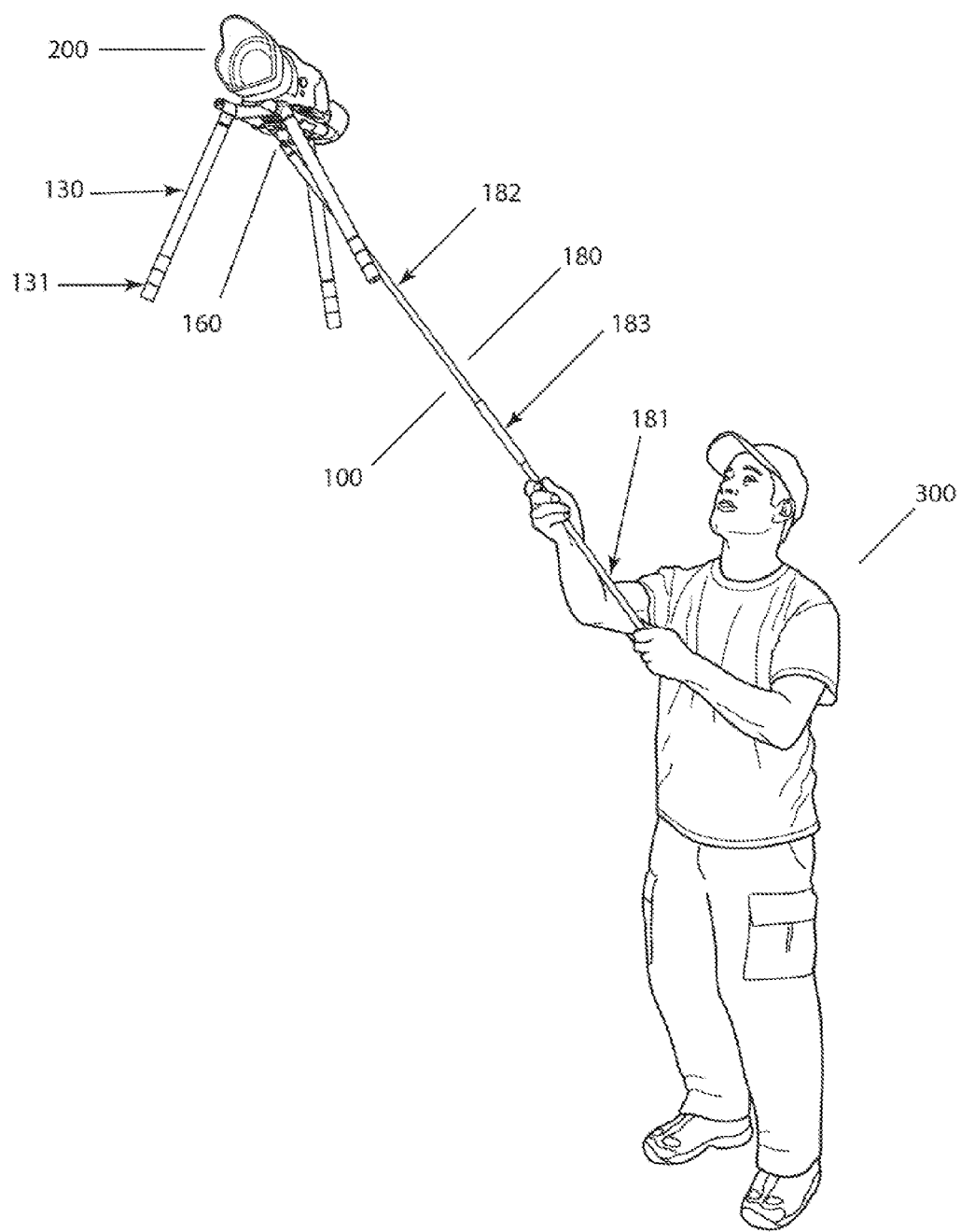
FIG. 11 illustrates the present invention or camera stabilization device as deployed by a user.

Illustrated in FIGS. 10 and 11 is one embodiment of the present invention or camera stabilization device 100 as deployed by a user 200. The camera stabilization device includes, a support frame, 120, with counter balance support legs 130 and counterbalance weights 131. Camera 200 is attached to the support frame 120 at camera mounting platform 110 (not visible). In the present embodiment, the camera stabilization device 100 is being extended away from the user 200 using a jib pole assembly 180 attached to the camera mounting platform at the three-axis bearing assembly 160. Handle 170 having a receptacle or socket 171 for the jib pole 180. It is contemplated that the jib pole 180 is a fixed length, is an adjustable length or has a plurality of sections than can be assembly to a desired length, such as lower jib pole section 181 attached to the upper section 182 at union or splice sleeve 183.

Figure 12:
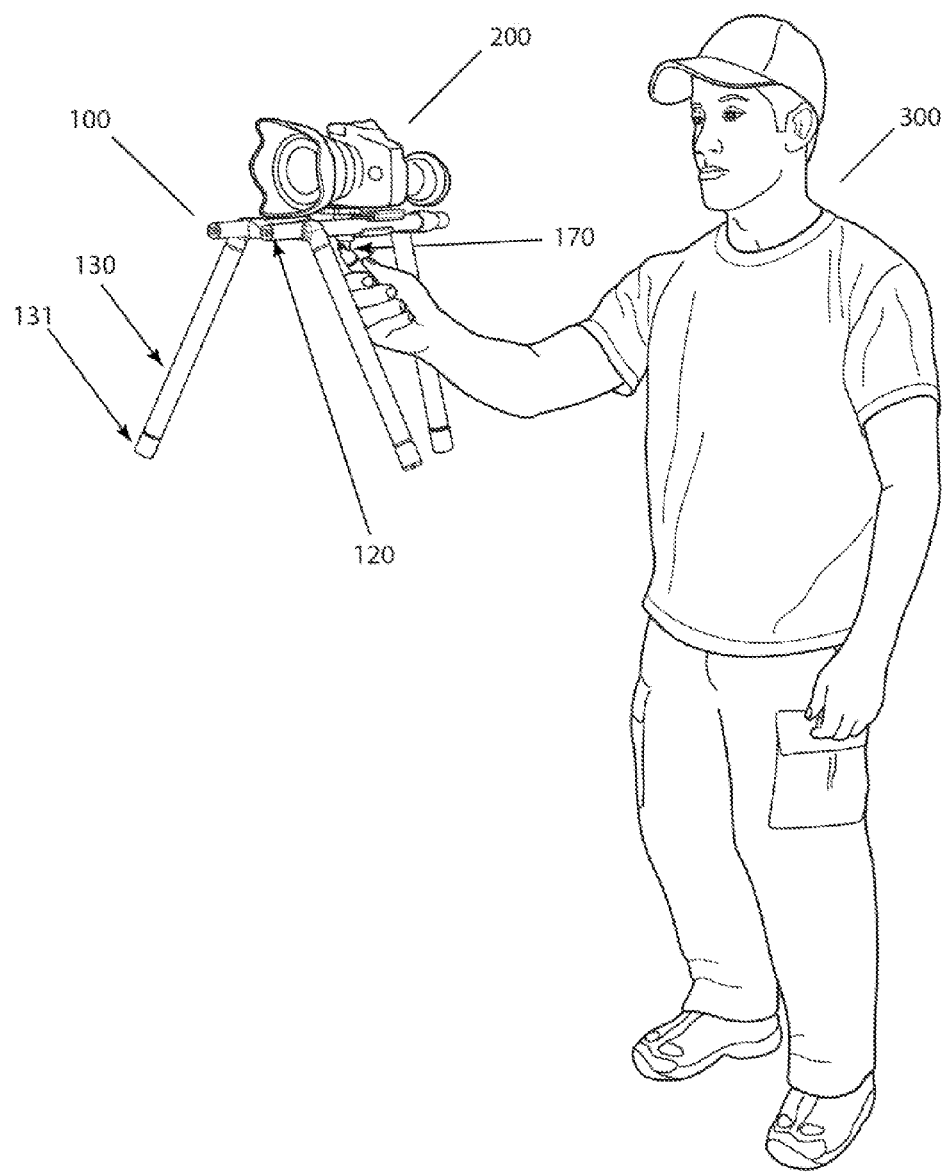
FIG. 12 illustrates the present invention or camera stabilization device as deployed by a user.

Illustrated in FIG. 12 is one embodiment of the present invention or camera stabilization device 100 deploy by the user 300 by grasping handle 170. When camera stabilization device 100 is properly adjusted, the user 300 may move handle 170, side to side or front to back, without adverse effect on image quality or changing the field of view of camera 200.

Figure 13:
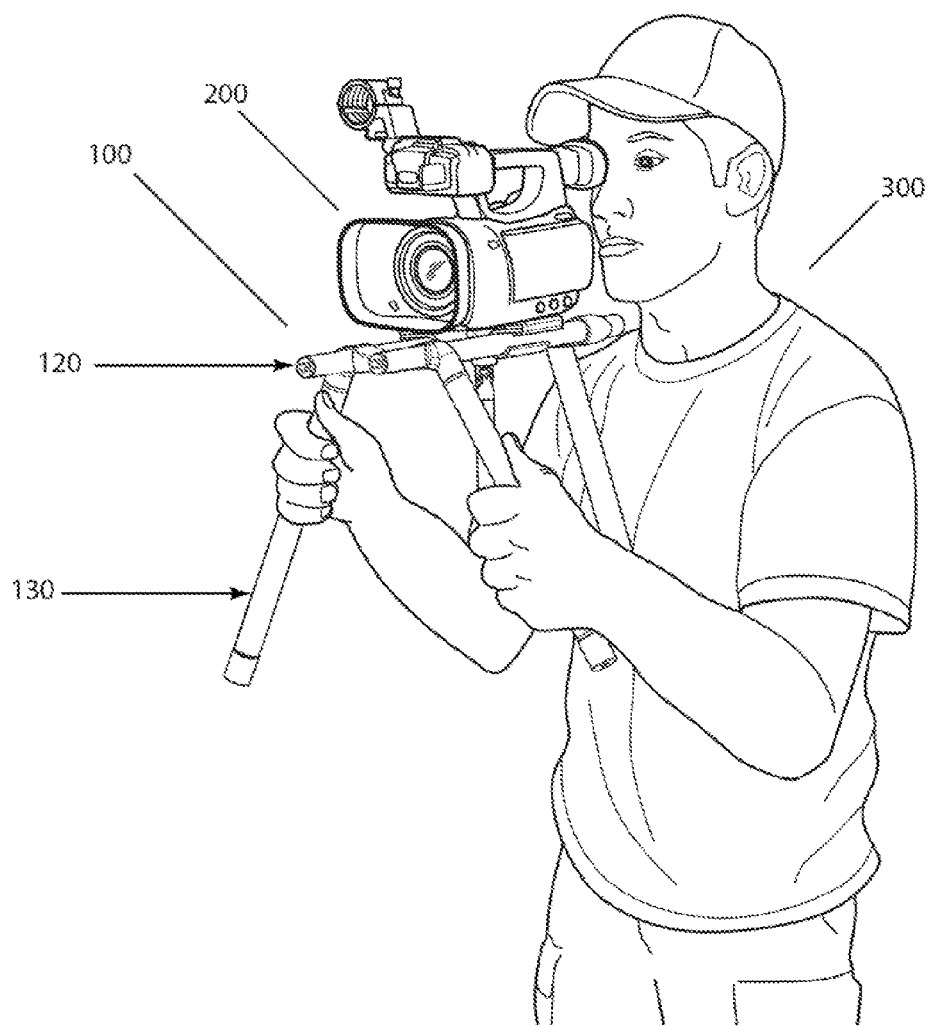
FIG. 13 illustrates the present invention or camera stabilization device as deployed by a user.

Illustrated in FIG. 13 in one embodiment of the present invention or camera stabilization device 100 where the user 300 is holding both front counter-balance support legs 130 to steady camera 200.

Figure 14:
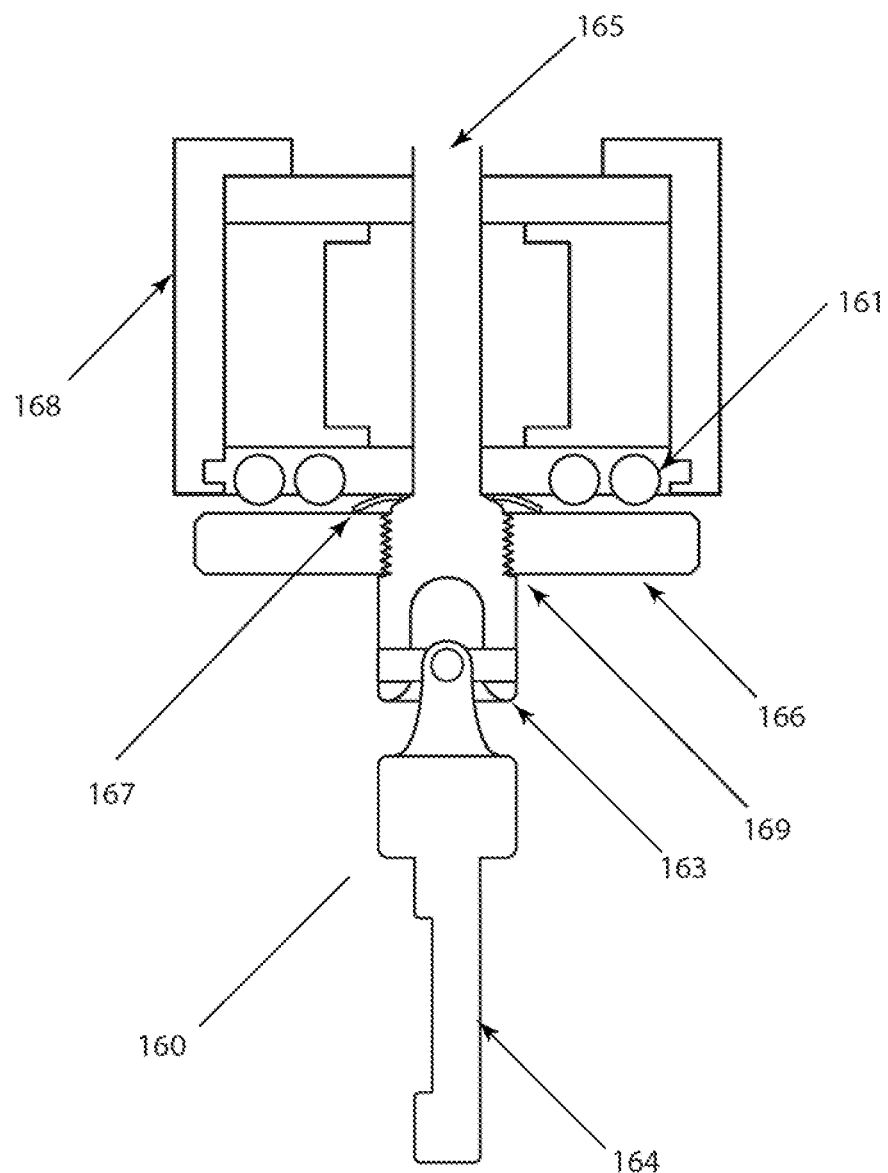
FIG. 14 illustrates a section view of the adjustable friction device of the present invention or camera stabilization device.

Illustrated in FIG. 14 is one embodiment of the present invention or camera stabilization device 100 showing details of the three-axis bearing assembly 160. Bearing assembly 160 includes the handle attachment spline 164, u-joint section 163, rotational bearing 161, installed in bearing housing 168, spindle shaft 165 and, a rotational friction assembly area, including thread section 169, rotational pressure plate 166 and friction disc 167. As configured, a user may shoot a stable video or motion picture image while holding the device handle 170. However, due to the high moment of inertia, the device 100 will resist input by the user 300 if the operator tries to use the handle 170 to tilt the camera angle up or down, however the user may move the camera field of view sideways, or pan, by rotating handle 170 or jib assembly 180. The rate of pan, in proportion to the rotation of the handle 170, can be increased or decreased by adjusting the rotational pressure plate 166 to compress or release friction disc 167.

Figures 15A, 15B:
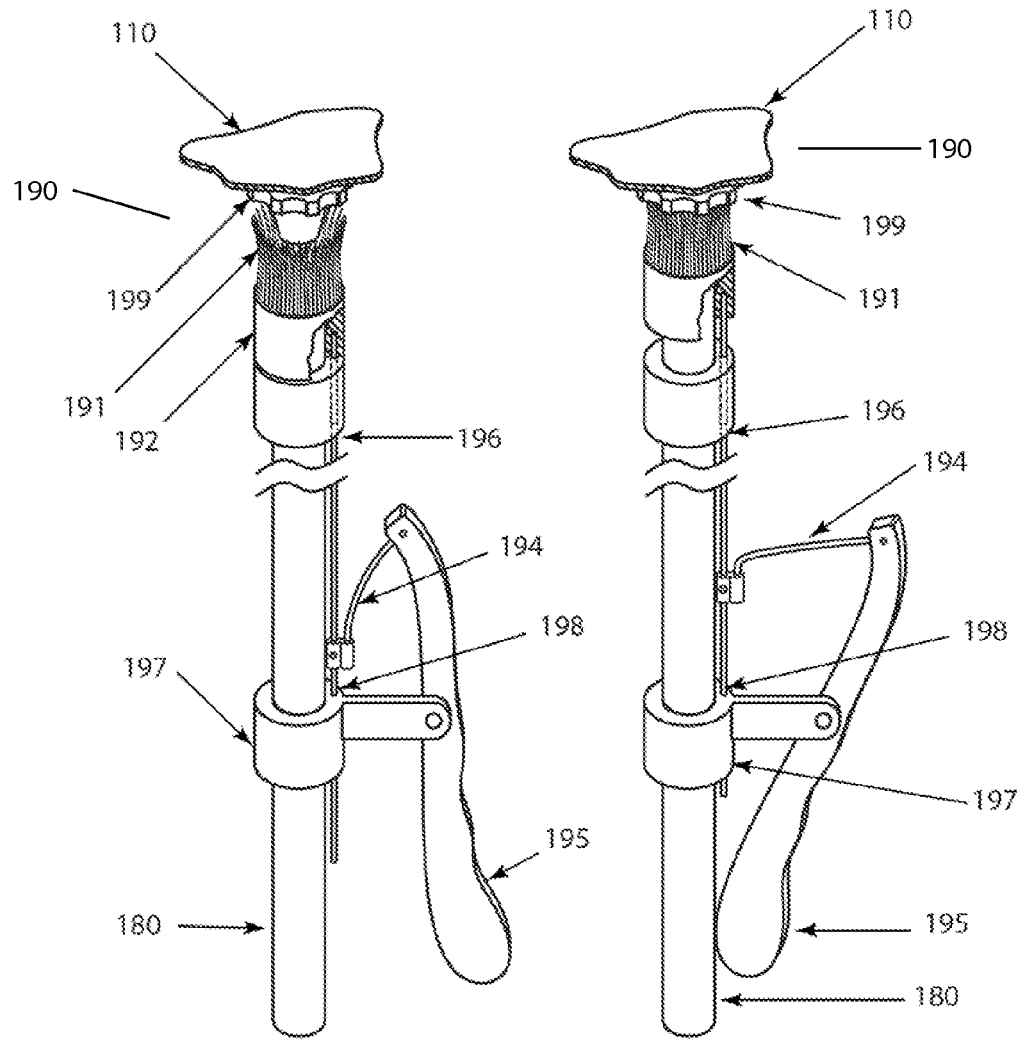
FIGS. 15A and 15B illustrate the adjustable lock-out mechanism of the present invention or camera stabilization device.

Illustrated in FIGS. 15A and 15B is one embodiment of the present invention or camera stabilization device 100 including a progressive lock-out mechanism 190. Lock-out mechanism 190 includes brush or cup 191 which engages friction cone 199. The mechanism 190 is assembled on jib pole 180 including an upper collar 192 having a guide hole 196, actuation rod 193, linkage 194, lower bushing 197 having a guide hole 198 and actuation handle 195. The lock-out 190 can be operated away from the multi-axis pivot point by compressing handle 195 as shown in FIG. 15B. When handle 195 is compressed, linkage 194 is tensioned, displacing actuation rod 193 upward and proportionally engaging brush/cup 191 against friction cone 199. A partial engagement maybe desired to effect the rate of camera pan when jib pole 180 is rotated or full engagement of lock-out 190 will allow a user to tilt the camera 200 up or down when desired. In one embodiment of the present invention or camera stabilization device 100, the three-axis joint 160 may be a ball and socket configuration.

In view of the foregoing, those having ordinary skill in the relevant art will appreciate the advantages provided by the features of the present disclosure.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A dynamically balanced camera stabilizer device comprising;
   a camera,
   a camera support frame,
   a camera mounting platform having a top portion and a bottom portion,
   a plurality of counter-balance support legs mounted directly to the camera support frame,
      the plurality of counter-balance support legs is at least three counter-balance support legs,
   a three-axis bearing assembly attached to the bottom portion of the camera mounting platform,
   the three-axis bearing assembly including,
      an adjustable friction disc assembly, and,
   a control handle.

2. The camera stabilizer device of claim 1 wherein, the plurality of counter-balance legs is three counter-balance support legs.

3. The camera stabilizer device of claim 1 wherein, the plurality of counter-balance support legs is one of,
   four or more than four counter-balance support legs.

4. The camera stabilizer device of claim 1 wherein, the plurality of counter-balance support legs include a plurality of removably attached counter-balance weights.

5. The camera stabilizer device of claim 1 wherein, the plurality of counter-balance support legs are extensible in length.

6. The camera stabilizer device of claim 1 wherein the camera, the camera mounting platform and the camera support frame may be adjusted fore and aft in relationship to the counter-balance support legs.

7. The camera stabilizer device of claim 1 wherein the camera, the camera mounting platform, and the camera support frame may be moved side to side in relationship to the counter-balance support legs.

8. The camera stabilizer device of claim 1 wherein the adjustable friction disc assembly includes,
   a rotation bearing,
   a friction disc, and,
   an adjustable pressure plate used to compress the friction disc.

9. The camera stabilizer device of claim 1 wherein the control handle has a jib pole receiver.

10. The camera stabilizer device of claim 1 including a jib pole having one of,
   a fixed length, and,
   a adjustable length.

11. A dynamically balanced camera stabilizer device comprising;

a camera support frame,
a camera mounting platform having a top portion and a bottom portion,
a plurality of counter-balance support legs,
a three-axis bearing assembly attached to the bottom portion of the camera mounting platform,
a handle,
a jib pole,
a progressive lock-out assembly,
the progressive lock-out assembly including,
- a annular brush encompassing the three-axis bearing assembly,
- a friction cone, and,
- a actuation assembly.

12. The camera stabilizer device of claim 11 wherein, the plurality of counter-balance legs is three counter-balance support legs.

13. The camera stabilizer device of claim 11 wherein, the plurality of counter-balance support legs is one of, four or more than four counter-balance support legs.

14. The camera stabilizer device of claim 11 wherein, the plurality of counter-balance support legs include a plurality of removably attached counter-balance weights.

15. The camera stabilizer device of claim 11 wherein, the plurality of counter-balance support legs, the three-axis bearing and the handle are affixed to a standard camera mount rail system.

16. The camera stabilizer device of claim 11 including a jib pole having a first end and a distal end.

17. The camera stabilizer device of claim 16 wherein the first end of the jib pole is attached to the three-axis bearing.

18. The camera stabilizer device of claim 16 wherein the actuation assembly is attached to the jib pole at the distal end.

19. The camera stabilizer of claim 11 wherein the actuation assembly is one of a lever and a screw jack.

20. A method of using a dynamically balanced camera stabilizer device comprising;
providing a camera support frame,
providing an adjustable camera mounting platform having a top portion and a bottom portion,
providing a plurality of counter-balance support legs,
   the plurality of counter-balance support legs having a plurality of adjustable counter-balance weights,
   the plurality of counter-balance support legs having adjustable length,
providing a three axis-bearing assembly having a rotational component attached to the bottom portion of the camera mounting platform,
providing a control handle attached to the three-axis bearing assembly, the control handle having a receiver for a jib pole,
providing an adjustable friction assembly in the rotational component of the three-axis bearing assembly,
installing a camera on the top portion of the camera mounting platform,
adjusting the length of the counter-balance support legs to counter-balance the camera mass,
adding or removing counter-balance weights from the counter-balance support legs to counter balance the camera mass,
adjusting the camera mounting platform to dynamically balance the camera in a stabile attitude,
providing a jib pole having a first end and a distal end,
installing the first end of the jib pole in the control handle receiver,
adjusting the friction assembly,
grasping the jib pole at the distal end,
extending the first end of the jib pole and the camera away from the user, and,
rotating the jib pole axially to pan the camera.

* * * * *